United States Patent [19]

Meister et al.

[11] Patent Number: 4,876,312
[45] Date of Patent: Oct. 24, 1989

[54] PROCESS FOR PREPARING RUBBER-MODIFIED STYRENIC POLYMER COMPOSITIONS CONTAINING HYDROPEROXIDE DERIVATIVES OF RUBBERY POLYMERS

[75] Inventors: Bernard J. Meister, Auburn; Craig D. Dryzga, Bay City; Li C. Tien, Midland, all of Mich.

[73] Assignee: The Dow Chemical Company, Midland, Mich.

[21] Appl. No.: 28,856

[22] Filed: Mar. 23, 1987

[51] Int. Cl.$^4$ ............................ C08F 4/34; C08F 4/36; C08F 279/04; C08F 291/18

[52] U.S. Cl. ........................................ 525/263; 525/66; 525/67; 525/68; 525/292; 525/301; 525/302; 525/310; 525/316

[58] Field of Search ................................ 525/263, 316

[56] References Cited

U.S. PATENT DOCUMENTS 3,222,423 12/1965 Roebuck ............................ 525/263
3,515,692 6/1970 Carrock et al. ..................... 525/263

Primary Examiner—Jacob Ziegler

[57] ABSTRACT

Hydroperoxidized rubber-containing polymers are prepared in a process wherein a rigid phase polymer is prepared by polymerization of one or more free radically polymerizable monomers in the presence of a hydroperoxidized rubbery intermediate in a well stirred back-mixed reactor operating under essentially homogeneous conditions at a solids content of from about 30 to about 75 percent by weight, and an initial rubber content in the feed of from about 5 to about 12 percent by weight.

5 Claims, 3 Drawing Sheets

PROCESS FOR PREPARING RUBBER-MODIFIED STYRENIC POLYMER COMPOSITIONS CONTAINING HYDROPEROXIDE DERIVATIVES OF RUBBERY POLYMERS

BACKGROUND OF THE INVENTION

This invention relates to an improved process for preparing rubber-modified polymeric compositions as well as the compositions prepared thereby. Specifically, it relates to polymers modified with grafted rubbery polymers, said grafted rubbery polymers being formed from hydroperoxidized rubbery polymer intermediates.

Rubber-modified polymer compositions are well-known in the prior art. Exemplary of such compositions are those comprising homopolymers and interpolymers of monovinylidene aromatic monomers and a reinforcing, modifying rubbery polymer. One technique for preparing such compositions involves polymerizing the monomers employed to prepare the matrix polymer in the presence of a hydroperoxidized rubbery polymer intermediate. Such an intermediate may be prepared by one of several techniques involving singlet oxygen induced hydroperoxidation. The process results in grafted rubbery polymers in a matrix polymer and permits precise control of the degree of rubber grafting employed.

Examples of previously known processes include those disclosed by U.S. Pat. Nos. 3,115,418; 3,925,076; 3,252,880; 3,081,242; and 3,484,353, the teachings of which are incorporated herein in their entirety by reference thereto.

Previously known processes of preparing rubber-modified monovinylidene aromatic polymer compositions utilizing hydroperoxidized rubbery intermediates have produced compositions having acceptable physical properties at low hydroperoxide levels less than about 15 micromoles (mmole) hydroperoxide/gram hydroperoxidized rubber. However, at higher rubber hydroperoxide graft levels previous processes have resulted in the preparation of compositions that are deficient in certain physical properties, especially toughness as measured for example by Izod impact strength.

As an explanation of this phenomenon, it is theorized that at high graft levels, the grafted polymer chains become crowded due to a lack of available rubber surface to which bonding may occur. Consequently the rubber membrane is subjected to greater stress and may even be ruptured or at least may be more easily broken when subjected to environmental forces such as shearing forces encountered during the polymerization process. The resulting smaller sized rubber domains apparently no longer contribute significantly to toughening of the matrix polymer.

It would be desirable to provide a rubber modified polymeric composition containing high levels of grafted styrenic polymer that avoids the detriment of reduced toughening ability.

In addition, it would be desirable to provide an improved process for the solution or bulk polymerization of polymers employing hydroperoxidized rubbery intermediates to obtain impact modified polymers having improved physical properties. Such polymer products may be usefully employed as injection molding resins, extrusion molding resins and in other applications.

DESCRIPTION OF THE FIGURES

FIG. 1 is a photomicrograph of rubber particles in a HIPS product prepared by a conventional mass polymerization process. FIG. 2 is a photomicrograph of the rubber morphology of a resin similar to that of FIG. 1 comprising a hydroperoxidized rubber. FIG. 3 is a photomicrograph of the rubber structure of a hydroperoxidized rubber containing polymer prepared according to the present process.

SUMMARY OF THE INVENTION

Figure 1:
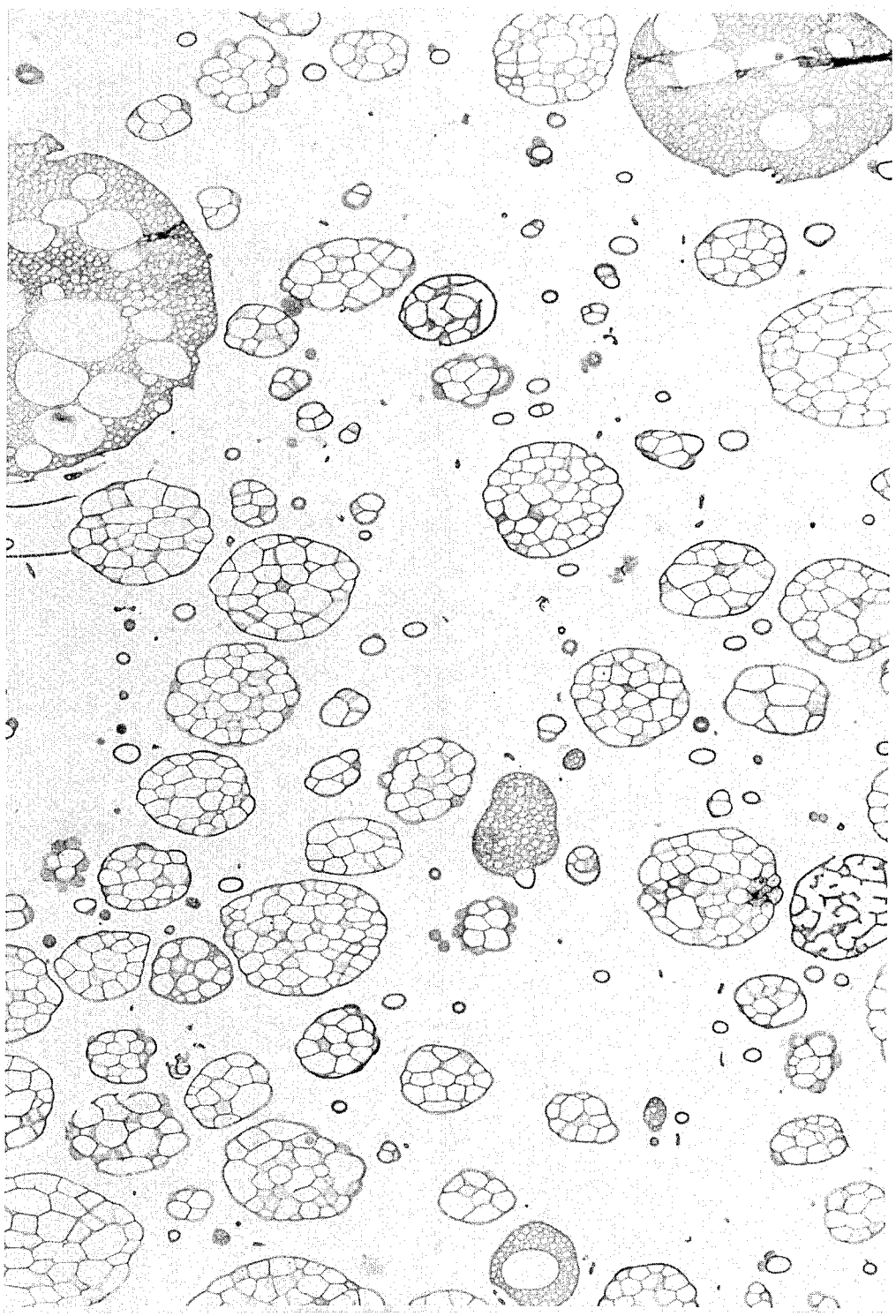
FIGS. 1–3 are photomicrographs illustrating various rubber morphologies.

According to the present invention there is now provided an improvement in the process wherein a rigid phase polymer is prepared by polymerization of one or more free radically polymerizable monomers in the presence of a hydroperoxidized rubbery intermediate, the improvement comprising conducting the portion of the polymerization wherein particle sizing and forced phase inversion occurs in a well stirred, back-mixed reactor operating under essentially homogeneous conditions at a solids content of from about 30 to about 75 percent by weight, and employing a feed stream having an initial rubber content based on monomer content of from about 5 to about 12 percent by weight.

The Matrix

The matrix of the present invention preferably comprises a homopolymer of a monovinylidene aromatic monomer or an interpolymer thereof with one or more copolymerizable comonomers.

Suitably the copolymerizable comonomer is employed in an amount from about 1 to 50, and preferably about 5 to 35 percent by weight.

Exemplary of the monovinylidene aromatic monomers suitable for use in the claimed invention are styrene: alpha-alkyl substituted monovinylidene monoaromatic compounds (e.g., alpha-methylstyrene, alpha-methylstyrene, alpha-methylvinyltoluene, alpha-methyl dialkylstyrenes, etc.): ring-substituted alkyl styrenes (e.g., ortho-, meta-, and para-vinyl toluene, o-ethylstyrene, p-ethylstyrene, 2,4-dimethylstyrene, p-tertiarybutylstyrene, etc); ring-substituted halostyrenes (e.g., o-chlorostyrene, p-chlorostyrene, o-bromostyrene, 2,4-dichlorostyrene, etc.): ring-alkyl, ring-halosubstituted styrenes (e.g., 2-chloro-4-methyl-styrene, 2,6-dichloro-4methylstyrene, etc.); etc. The alkyl substituents generally have one to four carbon atoms and may include isopropyl and isobutyl groups. If desired, mixtures of one or more such monovinylidene aromatic monomers may be used.

Suitable copolymerizable comonomers include different monovinylidene aromatic monomers; unsaturated monobasic acids and derivatives thereof such as acrylic acid, methyl acrylate, ethyl acrylate butyl acrylate, 2-ethylhexyl acrylate, methacrylic acid, methyl methacrylate, etc.; acrylamide; methacrylamide; vinyl halides such as vinyl chloride, vinyl bromide, etc.; vinylidene chloride, vinylidene bromide, etc.; vinyl esters such as vinyl acetate, vinylpropionate, etc.; dialkyl maleates or fumarates such as dimethyl maleate, diethyl maleate, dibutyl maleate, dimethyl fumarate, etc; divinylidene aromatic monomers such as divinyl benzene, etc.; unsaturated nitriles such as acrylonitrile, methacrylonitrile, etc.; unsaturated dicarboxylic acid anhydrides; N-substituted maleimides; etc.

The preferred copolymerizable comonomers are acrylonitrile and methyl methacrylate.

All or part of the matrix polymer can be formed in the reaction used to produce the grafted rubbery polymer. In addition, blends of matrix polymer may be prepared by incorporating therein additional polymers such as polyamides, polyarylene ethers, polycarbonates, etc. Other additives such as plasticizers, fiberglass, or other reinforcing aids, antioxidants, pigments, extenders, colorants, etc. may also be blended into the composition.

The Grafted Rubbery Polymer

The grafted rubbery polymer of the present invention comprises a rubbery polymer substrate, said rubbery polymer substrate having grafted thereto a superstrate polymer that comprises at least a portion of the matrix phase. The grafted rubbery polymer is prepared during the grafting process of the present invention.

The term "rubbery polymer" is intended to encompass those polymers having a glass transition temperature (Tg) of not higher than 0° C., preferably not higher than −20° C., as determined by ASTM D-756-52T. Suitable rubbers include homopolymers and interpolymers of conjugated alkadienes, ethylene-propylene copolymers (EP rubber), ethylene-propylene-diene copolymers (EPDM rubber), homopolymers and copolymers of $C_{1-8}$ alkylacrylate, and the silicone rubbers. Examples of suitable conjugated alkadiene rubbers include homopolymers or interpolymers of butadiene, isoprene, piperylene, chloroprene, etc. Suitable copolymerizable comonomers include monovinylidene aromatic monomers, alkyl methacrylates, unsaturated nitriles, unsaturated carboxylic acids, etc. The rubbery polymer may be a homopolymer, a block copolymer, or a random interpolymer.

In a preferred embodiment of the present invention, the rubbery polymer is a homopolymer of 1,3-butadiene. Especially preferred are such rubbery polymers having a Mooney viscosity (ML4 @100° C.) of at least about 30.

The grafting of matrix polymer to hydroperoxidized rubber is conducted simultaneously with the polymerization of matrix polymer. The hydroperoxide derivative of the rubbery polymer may be previously formed or prepared concurrently during the polymerization process. This is accomplished by generation of singlet oxygen in the presence of the rubbery polymer by any suitable technique. A preferred method is the light induced decomposition of a reactive organic peroxide. Alternatively, singlet oxygen can be formed from oxygen, ozone, or an ozone adduct such as a triphenylphosphite ozone adduct.

After formation of the hydroperoxide modified rubbery polymer, polymerization of a matrix polymer in the presence of such rubbery polymer may be commenced. Grafting of the matrix polymer to the rubbery polymer preferentially occurs at the hydroperoxide grafting sites generated on the rubbery polymer.

The Polymerization Process

The reactor in which particle sizing and forced phase inversion occurs that is employed in the process may be any well mixed reactor provided that the reactor contents are maintained in substantial uniformity. By the term substantial uniformity is meant that the reactor contents are maintained in a sufficiently homogeneous state that rubber phase inversion and particle formation occurs sufficiently close to the point of feed addition to the reactor that a high viscosity reaction mixture capable of stabilizing the rubber membrane and preventing rubber particle degradation is achieved. Preferably the resulting product exhibits improved toughness as measured by Izod impact strengths as compared with conventionally prepared grafted hydroperoxidized rubbers having equivalent levels of grafted matrix phase. Most preferably, the rubber-modified monovinylidene aromatic polymers of the invention demonstrate Izod impacts for injection molded samples of at least about one ft-lb/in notch utilizing rubbers containing from about 15 to about 50 mmoles hydroperoxide per gram.

Because the reactor contents are maintained at high solids loadings, between about 30 to about 75 percent by weight, the integrity of the rubbery membrane is more easily retained during the polymerization. Substantial reactor uniformity is therefore desired to prevent excessive localized shear induced destruction of the hydroperoxidized rubbery polymer membrane. For this reason, the reactor is operated under essentially steady conversion conditions.

Figure 2:
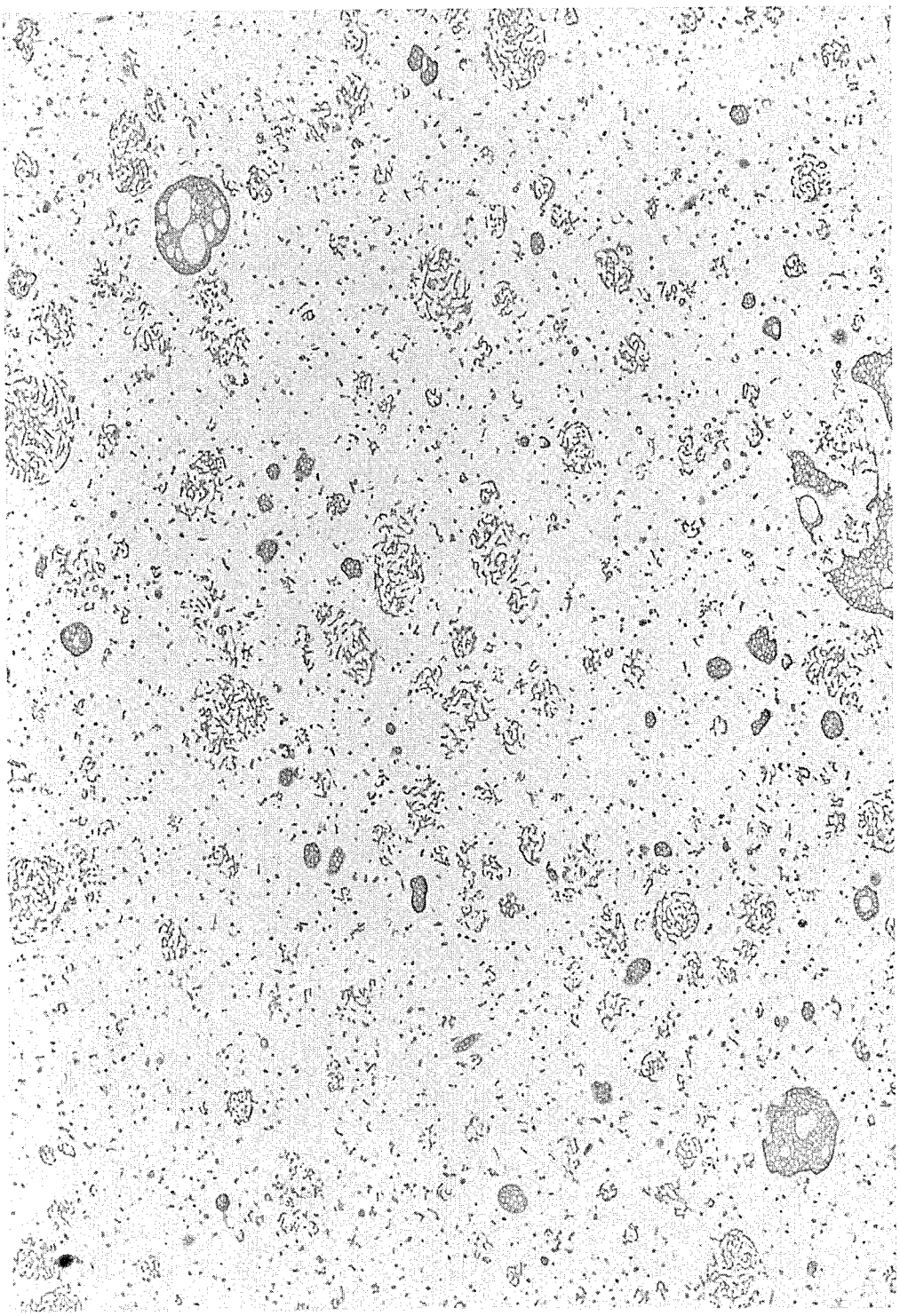
Figure 3:
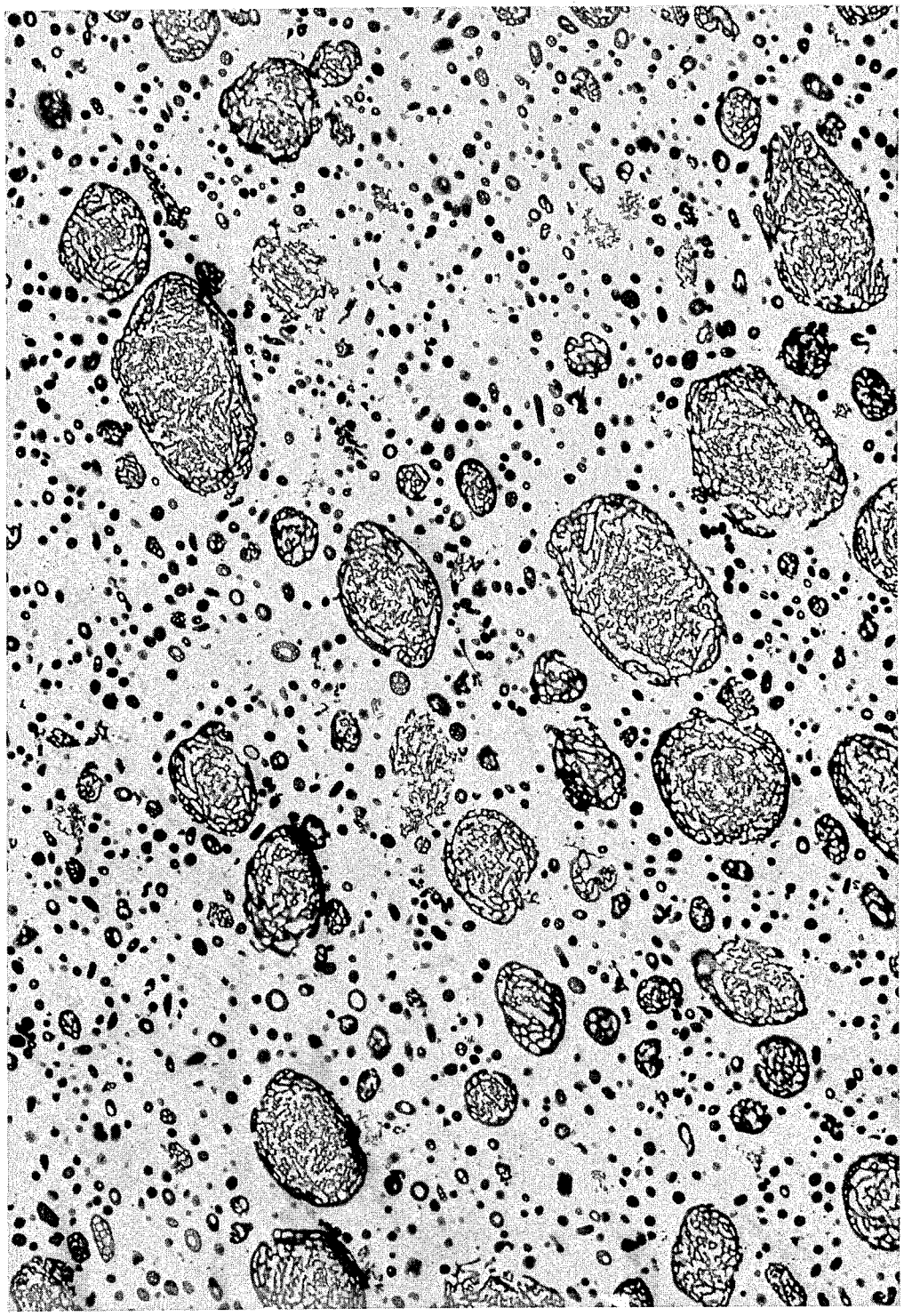

The results obtained according to the present process are readily apparent in transmission electron micrographs (TEM) of the rubber structure. In conventional plug flow processes rubber reinforced polymers prepared by conventional grafting of nonhydroperoxidized rubbers show well developed occluded rubbery polymer particles. This structure is typified in the TEM submitted herewith as FIG. 1. However, in the same process, the use of a hydroperoxidized rubber especially a highly hydroperoxidized rubber results in excessive rubber particle destruction and resultant loss of ultimate resin properties. This result is shown in FIG. 2. This may suggest that a hydroperoxidized rubber forms a less stable inverted phase structure which is subject to degradation when prematurely subjected to shear. However, when a hydroperoxidized rubbery polymer similar to that utilized in the sample of FIG. 2 is employed according to the process of the present invention, large, well-formed rubber particles remain in the resulting product and provide improved impact properties. This result is shown in FIG. 3. As may be seen, substantial numbers of rubber particles having a volume average particle size of at least about 1.0 $\mu$ are present in the polymers of the invention. Moreover, the rubber particles have a unique open morphology showing a continuation of occluded matrix polymer.

The process conditions employed in the invention otherwise are those previously known in the art for generation of grafted hydroperoxidized rubbery polymers. Preferably the process employs the hydroperoxidation and grafting of the dissolved rubbery polymer by the monomer or mixture of monomers employed in the preparation of at least some of the matrix polymer. Preferably, photo induced hydroperoxidation is employed. In such a process, a singlet oxygen source such as a feed containing dissolved oxygen, optionally in the presence of a photosensitizing agent, is exposed to electromagnetic radiation sufficient to induce formation of singlet oxygen in the presence of the rubber until the desired degree of hydroperoxide content is obtained. Suitably, enough source of singlet oxygen is employed to provide from about 2 to about 100 micromoles of singlet oxygen for each gram of rubbery polymer. The advantages of the present process are most apparent at elevated hydroperoxide levels, e.g. from about 15 to about 50, preferably from about 20 to about 40 micromoles hydroperoxide per gram of hydroperoxidized rubber.

Exemplary of the suitable photosensitizing agents are methylene blue, Rose Bengal, Eosin Y, tetraphenylporphine and Erythrosin B. A most preferred photosensitizer is methylene blue. The photosensitizing agent is added in an amount sufficient to generate the required singlet oxygen. Generally, amounts from about $1 \times 10^{-4}$ to about $1 \times 10^{-1}$ weight percent based on total solution weight are employed.

It is also often found desirable to employ a solubilizer for the photosensitizing agents to aid in the dissolution thereof. The more completely the photosensitizing agent is dissolved in the rubber-containing polymerizable solution, the faster the hydroperoxidation reaction proceeds.

Suitable for use as a solubilizer is any compound which solubilizes the photosensitizing agent in the rubber-containing polymerizable solution without significantly interfering with the hydroperoxidation of the rubbery polymer. Preferred solubilizers include the following: methanol, ethanol, acrylonitrile, acetonitrlle, ethyl acetate, ethylene glycol, o-dichlorobenzene, and dimethylsulfoxide. A most preferred solubilizer is methanol.

The solubilizer is employed in an amount suitable to completely or nearly completely solubilize the photosensitizing agent in the rubber-containing polymerizable solution. Generally, the solubilizer is employed in an amount of from about 0.1 to about 20 weight percent based on total weight of the rubber-containing polymerizable solution.

Suitable electromagnetic radiation has a wavelength between 3,000 and 8,000 Angstroms. Preferably, the electromagnetic radiation is visible light.

The exposure to light may be a single exposure or a plurality of exposures and may occur before polymerization or simultaneously therewith. The total length of exposure to light is dependent on a variety of factors including: amount of dissolved oxygen present, intensity of the light, amount of photosensitizing agent present, and the number of hydroperoxide groups intended to be formed. The average number of hydroperoxide groups formed per rubbery polymer chain can be controlled most effectively by controlling the exposure to light and/or the amount of singlet oxygen source present in solution.

After the hydroperoxidization of the rubbery polymer, more solvent or monomer may be added to the mixture and the mixture is then polymerized. Suitably the polymerization may be initiated by merely heating the reaction mixture. The hydroperoxide sites of the rubbery polymer appear to act as a suitable initiator for the polymerization process. Optionally initiators, such as a redox initiators, e.g., ferrous naphthanate, etc., or conventional free-radical initiators may also be employed. Suitable polymerization temperatures are from about 40° to about 170° C.

Any free radical generating initiator may be used in the polymerization of the rubber-containing reaction mixture including azo, peroxide, or other known initiators. Preferred are peroxide initiators such as di-tert-butyl peroxide, benzoyl peroxide, lauryl peroxide, di-tert-butyl diperphthalate, tertbutyl-peracetate, tert-butyl perbenzoate, dicumyl peroxide, tert-butyl peroxide, isopropyl carbonate, 1,1-bis(t-butylperoxy) cyclohexane, 2,5-dimethyl-2,5-di(tert-butylperoxy) hexane, tert-butylhydroperoxide, cumeme hydroperoxide, p-methane hydroperoxide, cyclopentane hydroperoxide, diisopropyl-benzene hydroperoxide, p-tert-butyl cumene hydroperoxide, 2,5-dimethyl-hexane-2,5-dihydroperoxide, etc., and mixtures thereof.

If desired, small amounts of antioxidants may be included in the rubber-containing polymerizable solution. Examples of suitable antioxidants include alkylated phenols, e.g., di-tert-butyl-p-cresol: and phosphites such as trinonyl phenyl phosphite. In general, the antioxidants may be added at any stage during the polymerization of the rubber-containing polymerizable solution. In some cases the antioxidants may interfere with the formation of the hydroperoxide derivatives. In those cases in which the antioxidant interferes with hydroperoxidation, the antioxidants must be added after formation of the hydroperoxide derivatives.

Optionally, a wide variety of diluents may be added to the rubber-containing polymerizable solution. Suitably, a diluent is generally present in an amount of less than 60 weight percent based on the total weight of the rubber containing polymerizable solution. Said diluents may be liquid materials which are generally nonreactive under polymerization conditions and act as a solvent for the polymer produced as well as for the starting monomer mixture. Examples of suitable diluents include ethylbenzene, toluene, benzene, xylenes, and aliphatic hydrocarbons such as hexane, heptane, etc.

The process may be performed in a single reactor or a series of reactors provided that the reactor where phase inversion occurs operates as previously mentioned. In a preferred embodiment, three reactors are employed. The first two reactors are back mixed reactors that operate in an essentially homogeneous condition. The second reactor operates at an elevated solids content compared to the first reactor. Preferably, the first reactor operates below phase inversion and the second reaction achieves phase inversion of the reaction mixture in the manner required for the present invention. Control over the solids content and final rubbery content of the polymer formed may be obtained by addition of quantities of monomer, rubber/monomer mixture or diluent to the reactor mixture after exiting the first reactor. The final reactor preferably operates in conventional plug flow mode and serves to achieve a high degree of polymerization of the available monomer.

The aforesaid combination of reactors results in a polymer product having an exceptional balance of impact strength and tensile strength properties believed to be obtained as a result of the previously mentioned rubber particle morphology. Moreover, the unique advantage of the invention is believed to result from the high viscosity conditions existing in the reactor, wherein phase inversion and rubber particle sizing occurs, thereby resulting in reduced rubber particle degradation.

Having described the invention, the following examples are provided as further illustrative and are not to be construed as limiting. Unless indicated to the contrary, all parts, ratios and percentages are expressed by weight.

EXAMPLE 1

A feed solution is prepared by dissolving 5783 gms of polybutadiene rubber (Diene 55, available from Firestone Tire & Rubber Company) in 54431 gms of styrene, 6,668 gms of ethylbenzene and 1020 gms of mineral oil. 13 gms of 1-1 bis t-butyl peroxy cyclohexane, 0.75 gm of methylene blue and 975 gms of methanol are added to the feed batch. The mixture is agitated overnight to obtain a homogenous solution. The feed solution is then pumped continuously at a rate of 660 gms per hour through a glass tube 30 inches (762 mm) long and 0.44 inch (11.2 mm) in diameter on which is shone a sodium light source of 100 watts. The amount of hydroperoxide attached to the rubber due to the photoreaction was measured to be 29.0 micromoles hydroperoxide per gram of rubber. The resulting solution (8.5 percent diene rubber content) is fed to a first reactor consisting of a hydraulically full reactor with interior volume of 750 cc that is agitated by a turbine at 280 rpm. This reactor is operated at a polymer temperature of 116° C. and the outlet solids (rubber and polystyrene) is measured to be 30 percent. The effluent from the first backmixed reactor is passed directly into a second similarly configured backmixed reactor which has 1500 cc volume and is agitated by a turbine at 260 rpm. The polymer temperature in the second reactor is maintained at 130° C. The outlet solids from the second reactor is 62 percent. This effluent is then passed to an agitated tower reactor having three temperature zones and a volume of 1500 cc. The third reactor is operated under substantially plugflow conditions. The three temperature zones in the reactor are operated at 130° C., 140° C. and 145° C. The final product has a solid content of 77 percent. The resulting material is then passed through a devolatilizer, strand die and cutter to produce the polymer in finished form.

The polymer is melted and formed into both compression molded and injection molded test specimens. Results of property testing are contained in Table I.

TABLE I

| SAMPLE | Impact Strength[1] | Tensile Strength[2] |
|---|---|---|
| Compression Molded | 2.7 | 3988 |
| Injection Molded | 5.2 | 4618 |

[1]Izod impact strength, ft-lbs/inch notch, ASTM D-256
[2]Tensile yield, psi, ASTM D-638

EXAMPLE 2

The reactor combination employed in Example 1 is utilized to prepare an ABS resin utilizing hydroperoxidized polybutadiene rubber. The polymerization mixture, containing 8.6 percent polybutadiene (Diene-55 ®), 50.6 percent styrene, 14.7 percent acrylonitrile, 26.3 percent ethylbenzene and 70 ppm 1-1bis t-butyl peroxy cyclohexane, is photolyzed as in Example 1 but for varying time periods to produce rubbery polymers having hydroperoxide contents as indicated in Table II. The resulting solution is charged at a rate of 450 gms per hour to a first back mixed, well stirred reactor operating at 105° C., and a solids level of 20 percent. The effluent is charged to a second similarly well stirred, back mixed, phase inverted reactor operating at 115° C. and 50 percent solids. Finally, the product is discharged to a stirred tube reactor having three zones (125°, 140° and 155° C., respectively). The resulting product had a solids content of 65 percent and a rubber content of 13 percent. The produot was recovered by devolatilization, extruding and cutting into pellets.

The finished product was remelted and compression molded. Results of polymers containing various hydroperoxide contents are contained in Table II.

TABLE II

| Hydroperoxide Content of Rubber[1] | Impact Strength[2] | Tensile Strength[3] |
|---|---|---|
| 12 | 4.0 | 3170 |
| 25 | 3.3 | 4000 |
| 35 | 4.2 | 6000 |

[1]μm OOH/gm hydroperoxidized rubber
[2]Izod impact, ft-lbs/in notch, ASTM D-256
[3]Tensile yield, psi, ASTM D-638

What is claimed is:

1. In a process wherein a rigid phase polymer is prepared by polymerization solution of one or more free radically polymerizable monomers in the presence of a hydroperoxidized rubbery intermediate, the improvement wherein the phase inversion and particle sizing is conducted in a well stirred back-mixed reactor operating under essentially homogeneous conditions at a solids content of from about 30 to about 75 percent by weight, and by use of a feed stream having an initial rubber content based on monomer content of from about 5 to about 12 percent by weight.

2. A process according to Claim 1, wherein the hydroperoxidized rubbery intermediate is a hydroperoxidized polybutadiene.

3. A process according to Claim 1, wherein the free radically polymerizable monomer is styrene or a mixture of styrene and acrylonitrile.

4. A process according to Claim 1, wherein the rubbery intermediate comprises from about 15 to about 50 micromoles hydroperoxide per gram of hydroperoxidized rubber.

5. A process according to Claim 4, wherein the rubbery intermediate comprises from about 20 to about 40 micromoles hydroperoxide per gram of hydroperoxidized rubber.

* * * * *

UNITED STATES PATENT AND TRADEMARK OFFICE
CERTIFICATE OF CORRECTION

PATENT NO. : 4,876,312

DATED : October 24, 1989

INVENTOR(S) : Bernard J. Meister, Li C. Tien, and Craig D. Dryzga

It is certified that error appears in the above-identified patent and that said Letters Patent is hereby corrected as shown below:

Column 2, line 39, "rene: alpha-alkyl" should correctly as --rene; alpha-alkyl--.

Column 2, line 42, "dialkylstyrenes, etc.):" should correctly as --dialkylstyrenes, etc.);--.

Column 2, line 49, "4methylstyrene," should correctly appear as --4-methylstyrene--.

Column 2, line 57, "acrylate" should correctly appear as --acrylate,--.

Column 3, line 34, "homopolyme," should correctly appear as --homopolymer,--.

Column 7, line 51, "1-1bis" should correctly appear as -- 1-1 bis --.

Column 8, line 11, "produot" should correctly appear as --product--.

Column 8, line 29, following the word polymerization, insert therefore --of a--.

Signed and Sealed this

Twelfth Day of February, 1991

*Attest:*

HARRY F. MANBECK, JR.

*Attesting Officer*  *Commissioner of Patents and Trademarks*